United States Patent [19]

Tucker et al.

[11] 4,056,887
[45] Nov. 8, 1977

[54] DEVICE FOR THE MEASUREMENT OF LIQUID LEVEL

[75] Inventors: Thomas Lee Tucker; Gilbert Halverson, both of West Palm Beach, Fla.

[73] Assignee: Scientific Instruments, Inc., Lake Worth, Fla.

[21] Appl. No.: 704,684

[22] Filed: July 12, 1976

[51] Int. Cl.² ........................................... G01G 23/24
[52] U.S. Cl. ..................................... 33/126.6; 73/295
[58] Field of Search ................... 73/290 R, 314, 321, 73/295; 33/126.5, 126.6

[56] References Cited

U.S. PATENT DOCUMENTS 3,969,941  7/1976  Rapp .................................. 73/295

FOREIGN PATENT DOCUMENTS 1,115,181  12/1955  France .................................. 73/314

*Primary Examiner*—S. Clement Swisher
*Attorney, Agent, or Firm*—Eugene F. Malin

[57] ABSTRACT

A system for determining remotely the distance from the bottom of a storage tank to the liquid-vapor interface of the stored liquid utilizing a pair of solid state electrical sensing elements whose electrical resistance varies as a function of element heat dissipation capable of providing continuous extremely accurate digitally displayed measurement information referenced to the bottom of the tank even when the stored liquid and vapor are at the same temperature. The solid-state electrical interface sensing elements are affixed at the end of a vertically suspended motor driven cable disposed within the storage tank which is coupled to a DC pulse activated stepping motor and a master control circuit connecting the signal output of the sensing elements to the motor. The motor and cable system in conjunction with the control circuitry provide and drive the motor in stepping increments for continuously determining the liquid-vapor interface as referenced to the bottom of the storage tank. A remote digital display showing the quantitative values of the liquid-vapor interface level is provided. Scaling logic circuitry correlates the digital pulse counting technique in conjunction with a step-by-step movement of the probe assembly through the DC stepping motor.

18 Claims, 6 Drawing Figures

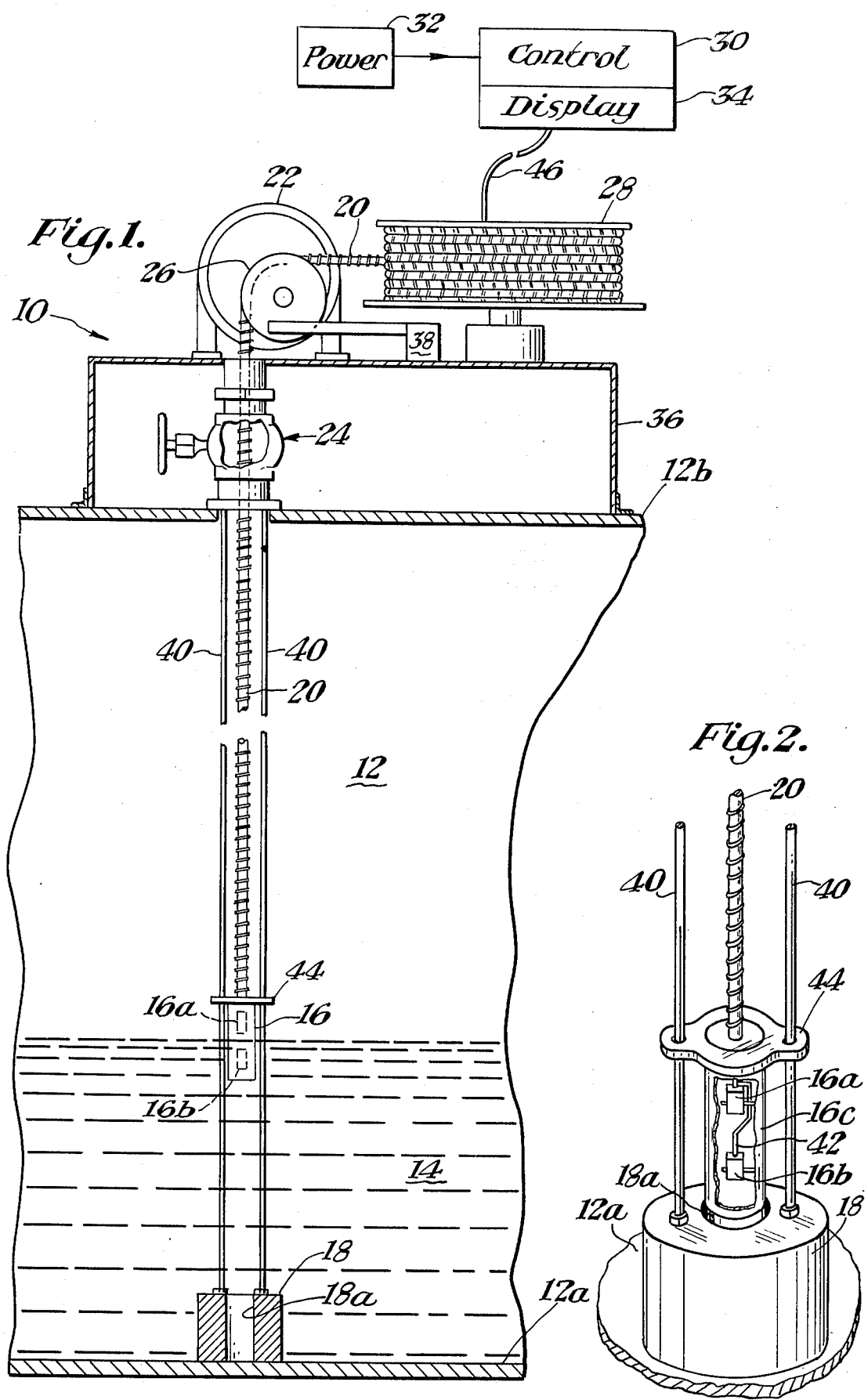

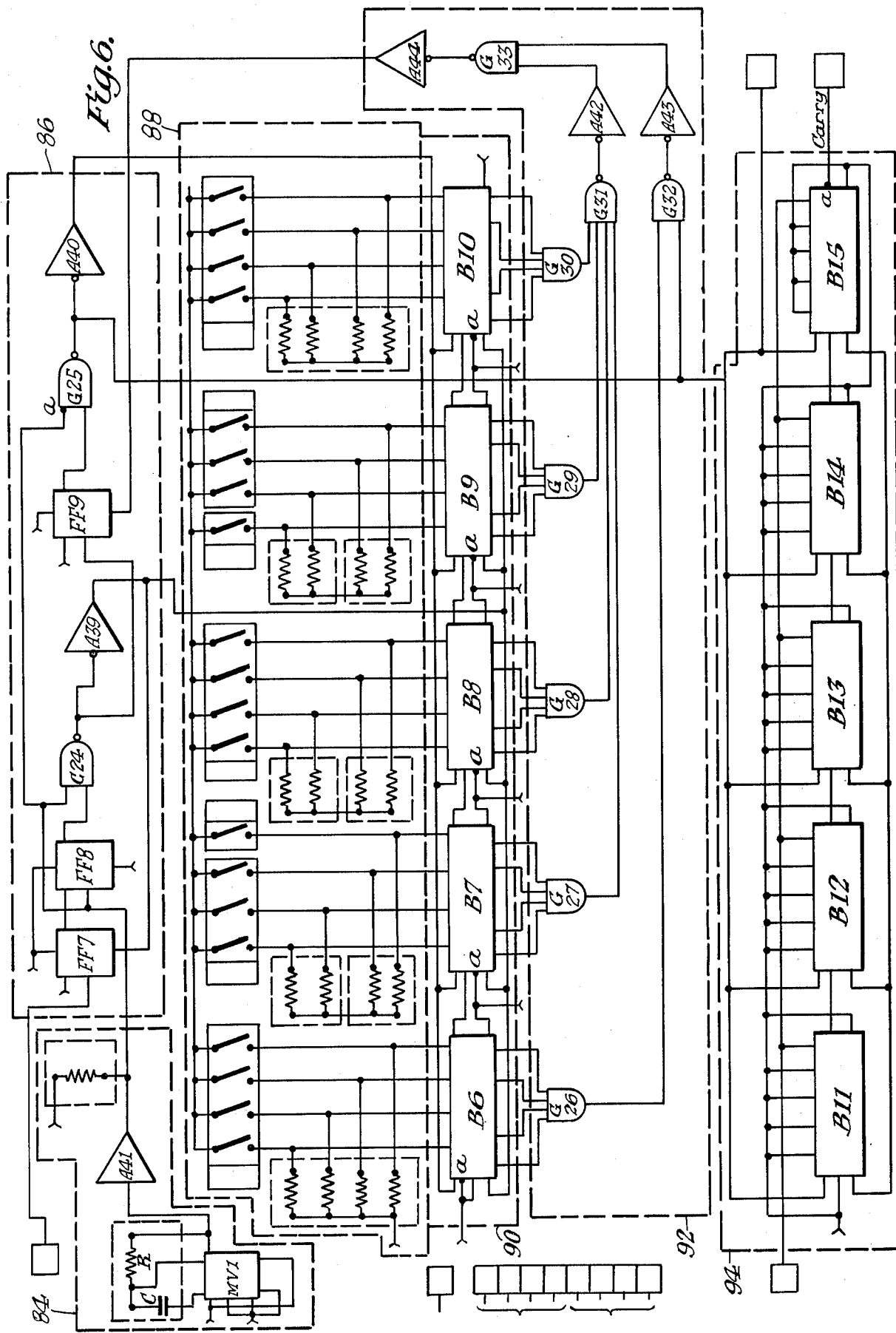

DEVICE FOR THE MEASUREMENT OF LIQUID LEVEL

BACKGROUND OF THE INVENTION

This invention relates generally to a system for determining the location of the liquid-vapor interface of a liquid stored in an inaccessible container, and specifically to an accurate, remote indicating system utilizing a step motor and command control circuitry with a pair of electronic liquid-vapor interface sensing probes connected to a digital remote display for determining accurately and continuously the liquid level for liquids such as liquified natural gas.

Many liquid level measuring systems are shown in the prior art for determining the level of a liquid stored in a generally inaccessible area utilizing electrical and/or mechanical type probes. Many of these devices have been found unacceptable because of their inherent complexity which often results in errors. Further, servicing and replacement of the units often require emptying the tanks for access to the particular level determining components. Many liquids, such as liquid natural gas for commercial use, must be, of necessity, stored in tanks which cannot be readily inspected internally by a human operator. Liquid natural gas is stored in a closed tank at a temperature of −258° Fahrenheit. One patent issued to Droin, et al, U.S. Pat. No. 2,683,371, issued July 13, 1954 shows a liquid level indicator using capacitative elements in conjunction with a motor driven screw and housing which are immersed within a tank, with control circuitry for an AC motor utilized with the capacitative elements in the circuit logic. The first drawback of the Droin device is that it is inherently inaccurate which can be an extremely important factor when measuring the liquid level in tanks that are extremely large (i.e. many liquid natural gas tanks can be up to 200 feet in diameter). The inherent inaccuracy results from the type of electromechanical drive system in conjunction with capacitative sensors and a mechanical meter for indicating liquid level. Another drawback of the Droin device is the permanent mounting of the probe support housing within the tank making maintenance and servicing extremely costly. Additional drawbacks in the Droin device are that it employs four probe elements and gearing and screw movement, all of which are inherently inaccurate.

The instant invention overcomes the problems shown in the prior art by utilizing a liquid-vapor interface probe having two electronic circuit elements whose resistance varies as a function of element thermal dissipation mounted on the end of a movable cable suspended within the storage tank, the output of each circuit element being connected electrically to a DC stepping motor and electrical control circuitry which includes a system logic such that the resistance of the sensing elements will provide a voltage that triggers stepping pulses to the motor which are coordinated with a pulse counter and digital display to provide extremely accurate measurement (referenced to the bottom of the storage tank) of the liquid-vapor interface within the inaccessible tank. One of the advantages of the present invention is that the interface sensing probe and control cable can easily and quickly be removed from the tank for servicing or repair. Another advantage of the present invention is the fact that the stepping motor, take-up reel, and cables may be easily installed on a tank and are assessibly located on the top of the storage tank, with the cable and interface probe being disposed downward into the tank through a sealed access valve. The present invention is further characterized by having reduced complexity and increased system reliability in addition to increased system accuracy.

BRIEF DESCRIPTION OF THE INVENTION

A machine for accurately measuring the liquid-vapor interface of a stored liquid (such as liquid natural gas) relative to a predetermined position regardless of the temperature of the liquid or the vapor comprising a liquid-vapor interface probe having an upper and lower sensor, a stepping motor, a helically geared probe suspension cable coupled to the stepping motor, the upper and lower sensors being connected to the bottom free end of the cable, level detection circuit means connected to the output of the upper and lower sensing elements in the probe, a motor driver circuit connected to the stepping motor, motor direction and speed control means connected to the output of the level detection means, a liquid level display means, an up-down counting means having its output connected to the liquid level display means, a counter control means connected to the output of the direction and speed control means, said counter control means having an output signal to the up-down counting means. The device includes a reference calibrating means which is connected to the mode control means for calibrating the up-down counter relative to the positioning of the probe assembly and the bottom of the storage tank. The interface probe utilizes a pair of solid state electrical resistance elements fastened at the end of a hollow, stainless steel drive cable having a helically grooved exterior surface.

The dual element liquid-vapor interface sensing probe includes a pair of electrical circuit elements whose resistance varies as a function of the resistive heat dissipation of each element. Each sensing element has a separate circuit, the output of each being coupled to a command control network that controls the motor drive and direction for moving the cable to position the sensing elements vertically (upwardly or downwardly) within the storage tank until a logic condition is satisfied whenever one sensing element is within the liquid while the other is in the vapor (sensing probe at liquid-vapor interface).

To operate the device, the motor control is actuated driving the drive cable and sensing probe in a downward direction until the probe housing contacts the bottom of the vessel or container whose liquid level is to be measured. A cable tension sensing switch is actuated when the probe housing contacts the tank bottom, signaling the zero reference point for the cable counter circuitry and display readout. Once the counting circuit and display have been set to zero, the motor control command circuitry then reverses the direction of the motor and begins counting pulsed motor steps correlated to the zero position while the dual element probe is being driven upwardly toward the liquid-vapor interface. The motor control circuitry is such that the motor will then reverse direction (after zero reference9 whenever both of the probe sensing elements have essentially the same resistive value, indicating that both sensing elements are submerged in the liquid or above the liquid in the vapor. Once reversed, the motor will continuously drive the probe elements until interface is determined, at which time one sensing element will be in the vapor with a lower resistance value than the sensing element is the liquid which has a higher resistance value. The sensing elements may be thermistors or other suitable circuit elements having desirable medium distinctive heat dissipative characteristics.

The controller and associated logic circuits function to generate either a "drive up or drive down" command depending upon the present position of the dual sensor probe assembly. If both sensors are in the liquid environment, the high level outputs of the level detection circuit can cause the direction control logic to generate a "drive up" command. If both sensors are in a vapor environment, the low level outputs of the detection circuits will cause the direction control logic to generate a "drive down" command. A clock pulse output from a counter and gating logic is translated in a drive interface logic network into a step clock, either step "up" or step "down". The latter depends on whether a drive up or drive down command respectively is in effect. Through the motor drive the step up (or step down) clock causes the stepping motor and the probe assembly connected to the cable and to the motor to step in the called for direction. The step clock is utilized to control the operation of scaling logic which includes a multivibrator, counter control logic, scaling switches, down counter, and zero detect logic. The purpose of the scaling is to correlate the counting technique for computing liquid level to the amount the probe assembly moves in response to each step in the stepping motor. The scaling logic is defined in greater detail below. The distance measurement (correlated to pulsed incremental motor movement) for determining liquid level in the tank is referenced to the bottom of the tank. Cable stretching and thermal contraction and expansion due to temperature variations are compensated electronically in the system.

One of the operative principles of the instant invention is that particular electronic circuit elements have current flow resistance values which vary greatly as a function of the specific heat of the surrounding medium which determines heat dissipation of the circuit element itself. For example, a resistive element immersed in a liquid medium would ordinarily dissipate more heat per watt than the same element immersed in a vapor medium. The resistance difference caused by the different rate of heat dissipation is thus utilized in the circuit logic to provide a signal output comparison of each sensing elements when using a dual element sensing probe such that a motor command control circuit in conjunction with a DC stepping motor can accurately find, measure, and position the sensing probe to liquid-vapor interface, even if the temperature of each medium is equal. The instant invention is particularly useful in measuring the liquid-vapor interface of particularly inaccessible liquids such as liquid natural gas which is stored in a sealed, protected tank, requiring a remote display.

For increased probe positioning accuracy, the system utilizes a helix drive coupling in conjunction with a helix drive cable known under the trademark TELEFLEX.

It is an object of this invention to provide an improved system for dtermining and displaying the quantitative value of the depth of a liquid in a storage tank.

It is another object of this invention to provide an improved liquid-vapor interface measurement system which includes a vertically separated dual element probe in which the resistance of each element is a function of the heat dissipation of the element, the probes being longitudinally spaced apart and coupled to a logic circuit which stops probe searching when one of the probe elements is immersed completely in the liquid medium while the second probe element is immersed in the vapor medium.

It is still another object of this invention to provide a remote liquid measuring device having a remote digital read-out display utilized in conjunction with a DC stepping motor that positions thermally sensitive electronic elements from a drivable cable which detect liquid-vapor interface.

But still yet another object of this invention is to provide a liquid-vapor interface measuring device of extreme accuracy which is non-complex in design and construction reducing construction costs while increasing system efficiency and reliability.

In accordance with these and other objects which will be apparent hereinafter, the instant invention will now be described with particular reference to the accompanying drawings.

BRIEF DESCRIPTION OF THE DRAWINGS

FIG. 1 shows a side elevational view of the instant invention installed in a tank.

FIG. 2 shows a perspective view of the sensing probe and weight as utilized in the instant invention.

FIG. 6 is a schematic block diagram of the scaling logic circuitry utilized in the instant invention.

PREFERRED EMBODIMENT OF THE INVENTION

Figure 3:
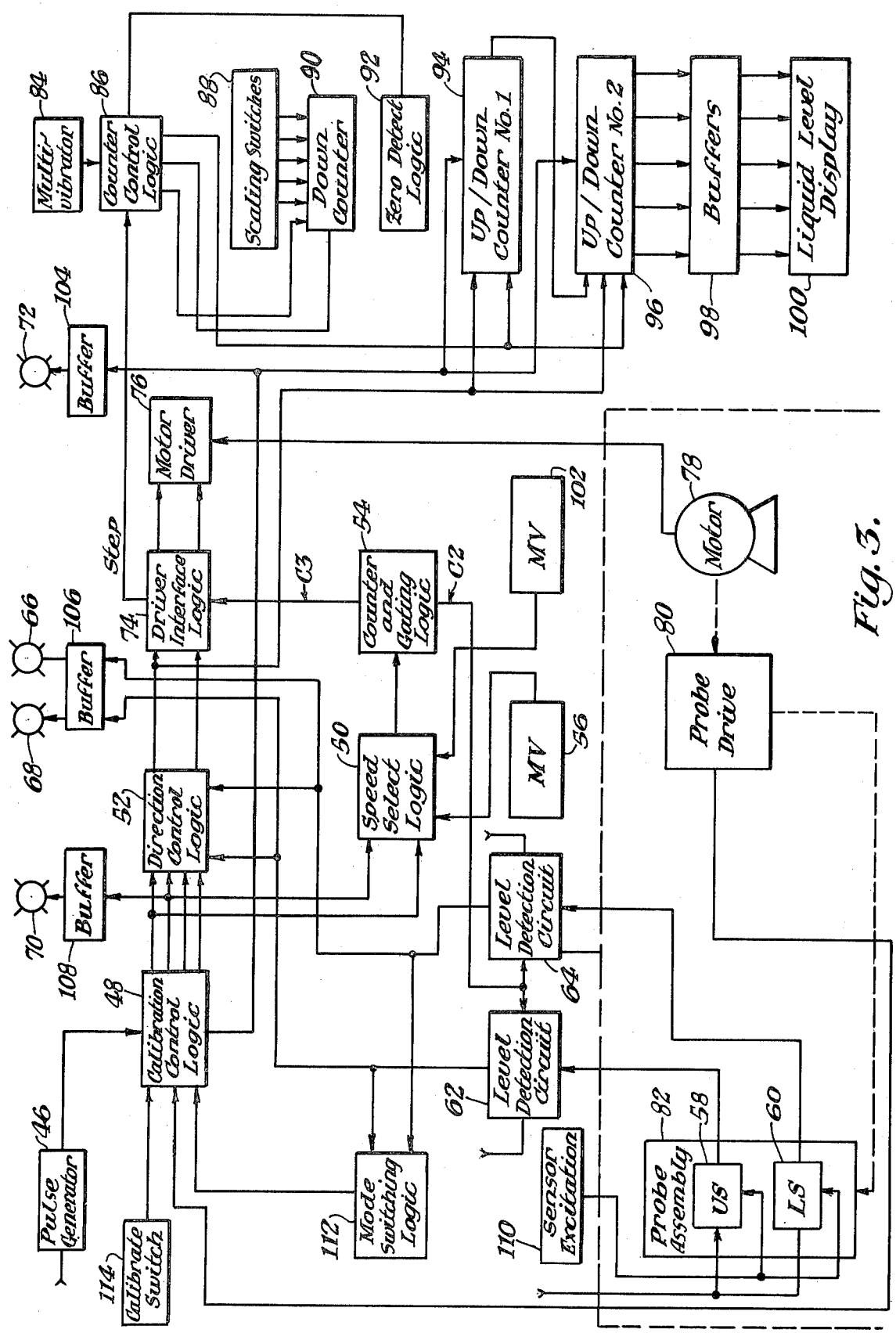
FIG. 3 shows a schematic block diagram of the electronic circuitry utilized in the instant invention.

Referring now to the drawings and in particular to FIG. 1, the instant invention is shown generally at 10 utilized with a storage tank 12 partially filled with liquid natural gas 14, having tank bottom wall 12a and top wall 12b. The invention includes a liquid-vapor interface probe 16 comprised of two solid state circuit elements 16a and 16b whose resistance varies as a function of heat dissipation and which are longitudinally separated and affixed along a supporting drive cable 20 which is described in greater detail below. A metal or concrete doughnut shaped weight 18 having a probe receiving aperture 18a is attached to the lower free end of two probe guiding supporting cables 40. A switch 38 connected near reel 28 detects reduced cable tension when the probe 16 contacts the tank bottom 12a. Switch 38 is utilized to set the digital display 34 and associated counting circuitry to zero and actuate command control signals. The probe support and drive cable 20 is connected at its upper end to a helix drive gear 26 mechanically coupled to an electric motor 22 which is used to raise and lower the drive cable 20 during the display zeroing and liquid-vapor interface searching operation. The reel 28 and motor drive is sealed by a housing (not shown) from the exterior environment. Thus, the motor drive equipment operates in the same gas environment as the tank. All electrical components are designed for operation in an explosive and hazardous environment. A closure valve 24 is provided between the motor drive housing and the tank 12 so that the probe housing can be withdrawn from the tank for necessary maintenance. The cable 20 is mounted at its upper end on a storage reel 28 which allows for taking up and paying out of the cable 20. The cable 20 in one embodiment is a helix-grooved hollow conduit manufactured under the trademark TELEFLEX which houses circuitry to the sensing elements 16a and 16b. During the vapor-liquid interface search, the amount of cable travel is measured by a binary BCD, presetable up-down counter. A digital display 34 allows for numerical readout of the particular level of the liquid as referenced from the tank bottom 12a in suitable units such as feet.

FIG. 2 shows the sensing probe 16 connected to cable 20 which includes a pair of semi-conductive, thermally responsive circuit elements 16a and 16b which are vertically separated and mounted in a stainless steel shield 16c which partially encloses the thermally responsive elements and serves to eliminate errors due to surface wave action. The shield 16c has a plurality of apertures so that liquid and vapor may contact both elements 16a and 16b. The probe housing 16c is guided by a pair of guy wires 40 which engage probe plate 44, are connected to weight 18 and auxiliary reels (not shown) for raising the weight (to remove entire unit). The stainless steel guy wires continue downward and are connected to the weight 18 on the tank bottom. The weight 18 includes an aperture 18a which is utilized to receive the probe and probe housing 16c such that the probe 16 may contact the bottom of the tank 12a to insure a proper zero reference position of the probe within the tank. Thus, the aperture 18a in the weight 18 receives the probe during the zero referencing as the probe is driven downward. The probe plate 44 engages the guy wires 40 on each side to properly stabilize the probe during its transit. The guy wires themselves also are utilized to raise the weight 18 if necessary to remove the entire device from the housing.

FIG. 1 shows the drive mechanism for cable 20 which includes a DC stepping motor 22, capable of being driven in either direction, mechanically linked and coupled to a helix cable drive pulley 26 which is engaged with the cable exterior. The cable drive pulley 26 is positioned adjacent a cable storage reel 28 which receives the inner electrical conduit 46 within the cable 20 connected to elements 16a and 16b. No slip rings or exposed electrical connections are required to transmit any sensor signals from the probe assembly to the control panel 30 and the display 34 which may be located remotely at some great distance. The guy wires 40 are fastened to a spring loaded winch (not shown) which can be used to raise and lower the weight if necessary.

FIG. 3 is a functional block diagram of the complete continuous LNG level-gauging system. It details the flow of information within the control unit, and between this component of the system, the dual-sensor probe assembly and the stepping motor/drive mechanism.

When the system is energized (via the control unit POWER switch), a pulse generator 46 within the control unit transmits a MASTER CLEAR pulse to the calibration control logic 48. This pulse causes the calibration control logic 48 to couple a CAL MODE (i.e., "not calibration" mode) signal to the speed select logic 50 and to the direction control logic 52.

By virtue of the CAL MODE signal, the speed select logic 50 coules the DRIVE SLOW CLOCK output of a multivibrator 56 to the counter and gating logic 54. This logic decodes a C2 clock and a C3 clock from the DRIVE SLOW CLOCK input.

The C2 clock is a system-synchronizing clock. Essentially, it serves to synchronize the outputs of the upper sensor 48 and lower sensor 60 level detection circuits 62 and 64 to the frequency at which the digital logic operates. The level detection circuits 62 and 64 compare the outputs of the probe sensors 58 and 60 to pre-adjusted set points, and generate logic levels indicative of the type of environment in which each sensor is located. Thus, for example, if the lower sensor is in a liquid environment, the corresponding level detection circuit will function to provide the voltage output. This output is applied to the direction control logic 52 and to the LOWER SENSOR IN LIQUID indicator 66. Conversely, if the lower sensor is in a vapor environment, the corresponding level detection circuit will produce a 0-volt output.

The C3 clock is a speed control clock. It serves to establish both the rate at which the stepping motor is pulsed and the rate at which the various counters within the control unit operate.

The direction control logic 52 functions to generate either a DRIVE UP or a DRIVE DOWN command, depending upon the current position of the dual-sensor probe assembly. If both sensors 58 and 60 are in a liquid environment, the high-level outputs of the level detection circuits 62 and 64 will cause the direction control logic 52 to generate a DRIVE UP command. If both sensors 58 and 60 are in a vapor environment, the low-level outputs of the detection circuits will cause the direction control logic 52 to generate a DRIVE DOWN command.

The C3 clock output of the counter and gating logic 54 is translated in the driver interface logic 74 into a STEP clock, and into either a STEP UP clock or a STEP DOWN clock. The latter depends upon whether a DRIVE UP or a DRIVE DOWN command respectively, is in effect. Via the motor driver 76, the STEP UP (or STEP DOWN) clock causes the stepping motor 78, and thus the probe assembly 82 to step in the called-for direction.

The function of the STEP clock is to control the operation of scaling logic, comprised of a 1.5 MHz multivibrator 84, counter control logic 86, scaling switches 88, a "down" counter 90, and zero detect logic 92.

The function of the scaling logic is to correlate the counting technique which is employed to compute liquid level, to the amount by which the probe assembly 82 moves in response to each step from the stepping motor 78. This amount is established via the preset positions of the scaling switches 88.

Operation of the scaling logic is as follows:
a. Upon receipt of the first STEP clock pulse, the counter control logic 86 generates a LOAD SCALING DATA command. This command causes the preset data in the scaling switches 88 to be loaded into the down counter.
b. The counter control logic 86 then generates 1.5 MHz COUNT DOWN CLOCK and COUNTER CLOCK outputs. The COUNT DOWN CLOCK causes the scaling data in the down counter 90 to be counted down. Simultaneously, the COUNTER CLOCK causes any data existing in up/down counters #1 and #2 to be either counted up or counted down at the same rate; the specific operation being dependent upon whether a DRIVE UP or a DRIVE DOWN command is in effect.

c. When the count in the down counter reaches zero, the zero detect logic 92 generates a STOP COUNT command. This command terminates generation of the 1.5 MHz COUNT DOWN CLOCK and COUNTER CLOCK signals. At this point in time, the count in up/down counters 94 and 96 will have been either increased or decreased by that amount preset into the scaling switches 88. This amount represents how far the probe assembly 82 has moved in response to the first step from the stepping motor 78.

d. Upon receipt of the second STEP clock pulse, the counter control logic 86 generates another LOAD SCALING DATA command and the count-down "sub-routine" is repeated.

For each STEP clock pulse generated, therefore, the probe assembly 82 moves a fixed amount, and the count in up/down counters 94 and 96 is either increased or decreased by this pre-set constant.

To calibrate the device, when the operator depresses and releases the calibrate switch 14, the START CALIBRATION command causes the calibration control logic 48 to terminate the CAL MODE signal and to initiate the CAL MODE and DOWN (CAL) signals. The CAL MODE signal causes the CALIBRATION IN PROGRESS indicator 70 to light. It also causes the speed select logic 50 to couple the DRIVE FAST CLOCK OUTPUT of a multivibrator 56 to the counter and gating logic 54. As before, this logic decodes the C2 and C3 clock signals, but these now occur at a faster rate than during normal system operation. The DOWN (CAL) signal is applied to the direction control logic 52 which functions to generate a DRIVE DOWN command.

As before, the C3 clock output of the counter and gating logic 54 is translated in the driver interface logic into a STEP clock and a STEP DOWN clock. These cause the stepping motor 78 to step the probe assembly 82 downward and the count in up/down counters 94 and 96 to decrease in correspondence.

When the probe assembly 82 reaches the bottom of the tank, the probe assembly drive mechanism (FIG. 1) causes a contact closure to occur in switch 38. This is accepted by the control unit as a PROBES AT REFERENCE signal. The calibration control logic 48 responds to this signal by terminating the DOWN (CAL) output, generating an UP (CAL) output and generating a PRESET signal. The latter lights the PROBES AT REFERENCE indicator 72 momentarily and also loads a fixed reference height into up/down counters 94 and 96, overriding any data which exists in these counters at this time.

The UP(CAL) signal causes the direction control logic 52 to terminate the DRIVE DOWN command and to initiate the DRIVE UP command. This, in turn, causes the drive interface logic 74 to terminate the STEP DOWN command and to initiate the STEP UP command. The probe assembly is therefore driven off the reference and the count in up/down counters 94 and 96 starts to increase from the reference height value.

When the probe assembly emerges from the liquid into the vapor environment, both the upper sensor and lower sensor level detection circuits (62 and 64) outputs drop to 0 volts. This causes mode switching logic 112 to generate a reverse drive command at a lower speed. The calibration control logic 48 responds to this command by decreasing the counts in the up-down counters 94 and 96 until the probe comes to the liquid-vapor interface, with one sensor in the vapor (0 volts) and one sensor in the liquid (+5 volts). The system then reverts to normal operations in which the DRIVE SLOW CLOCK multivibrator controls the speed of probe assembly movement and the status of the sensor level detection circuits control its direction.

Figure 4:
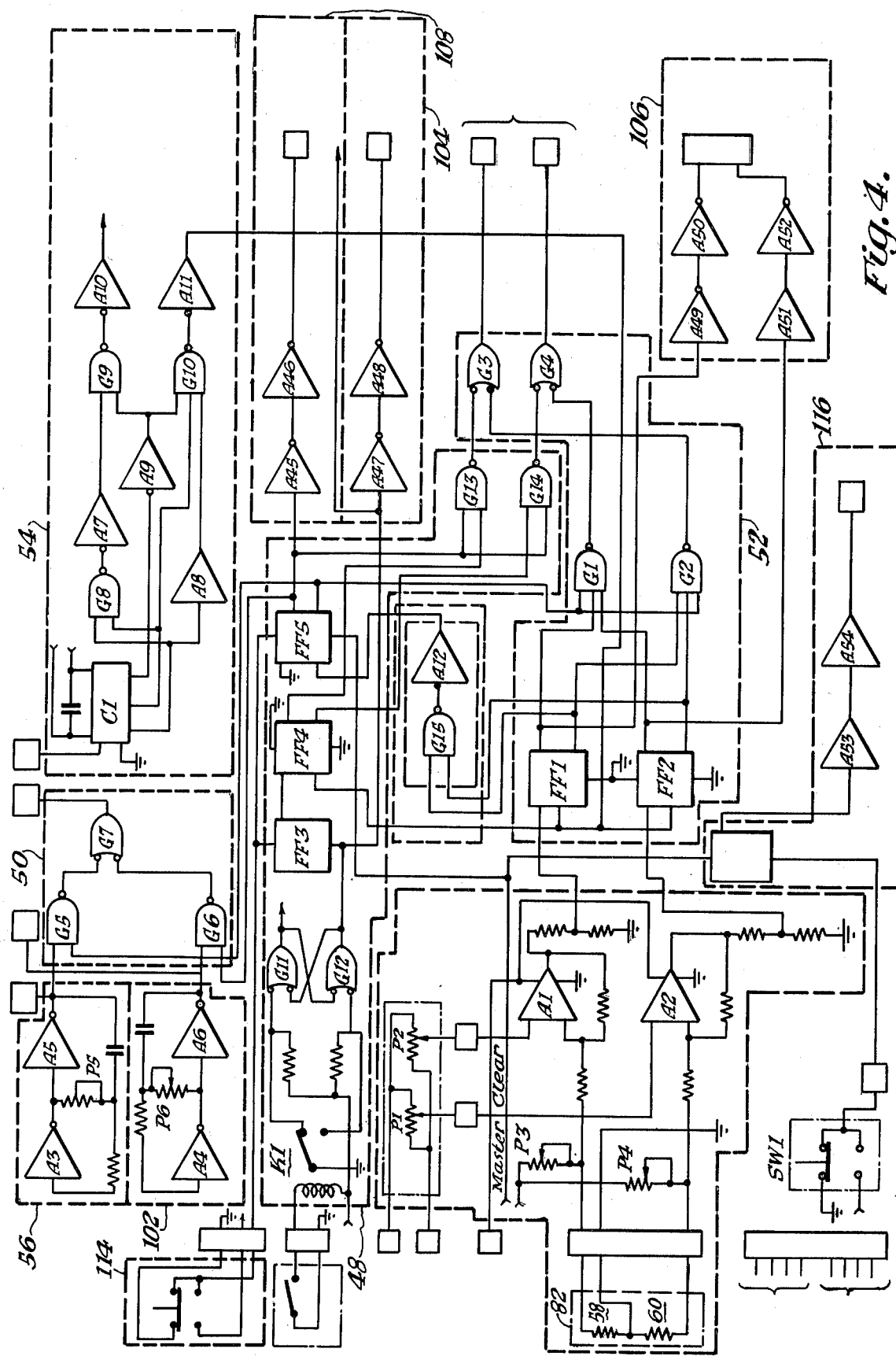
FIG. 4 shows a schematic diagram of the control and display logic circuitry of the instant invention including the level detection circuits.

FIG. 4 shows the level detection circuit and upper and lower 58 and 60 sensors utilized in one embodiment of the instant invention. The circuits, as shown, are comprised of two operational amplifiers A1 and A2 (type LM324) set point adjust potentiometers P1 and P2 and sensor excitation adjust potentiometers P3 and P4. When the environment of either sensor, S1 or S2 changes from the surrounding vapor medium to the liquified gas medium, the liquified gas medium, the liquified gas rapidly dissipates the small amount of heat generated by the sensor excitation voltage, increasing the resistance of the particular sensor sharply. The operational amplifier senses an increase in resistance as an increase in signal voltage. When the level of the input voltage exceeds the pre-adjusted set point voltage, the output of the operational amplifier changes from an essentially zero volt output to a level suitable for triggering a particular associated digital logic circuitry.

FIG. 4 also shows the direction control logic 52 comprising "D" type flip flops FF1 and FF2 and NAND gates G1, G2, G3 and G4. When the output signal and voltage of both sensor level detection circuits are high (i.e. both sensing elements in the liquid medium) the Q outputs of flip flops FF1 and FF2 will go high during the positive going transition of the next C2 (sync clock) pulse from the counter and gating logic 54. When the system is in calibration mode, making the calibration mode signal effective, NAND gates G1 and G4 generate a DRIVE UP command. When the outputs of both sensor level detection circuits are low (both sensing elements in a vapor medium) the Q outputs of flip flops FF1 and FF2 will go low upon receipt of the next C2 clock pulse. If the calibration mode signal is in effect, NAND gates G2 and G3 will function to generate a DRIVE DOWN command.

The speed select logic circuit is shown comprises of NAND gates G5, G6 and G7. Associated DRIVE SLOW CLOCK and DRIVE FAST CLOCK multivibrators are comprised, in part, of inverting buffers A3, A4, A5 and A6 and frequency adjust potentiometers P5 and P6. When the calibration mode signal is in effect, NAND gates G5 and G7 function to couple DRIVE SLOW CLOCK output of the associated multivibrator to counter C1 in the counter and gating logic 54. When the calibration mode signal is in effect NAND gates G6 and G7 function to couple the DRIVE FAST CLOCK output of the associated multivibrator to counter C1. The outputs of the multivibrators are also applied to "fast/slow" switch on the control panel. During the manual drive mode, activation of this switch applies the selected multivibrator output to counter C1 via the automatic drive/manual drive switch. The counter and gating logic 54 is comprised of a binary counter C1 connected to NAND gates G8, G9 and G10 and inverting buffers A7, A8, A9 A10 and A11. The elements function to decode the C2 and C3 synchronizing clocks.

Referring now to FIG. 4, the calibration control logic 48 is comprised, in part, of relay K1, NAND gates G11, G12, G13 and G14 and "D" type flip-flops FF3, FF4 and FF5.

Initially, relay K1 is de-energized (by virtue of the normally-open PROBES AT REFERENCE switch within the probe assembly drive mechanism), the REFERENCE output of NAND gate G11 is high and flip-flops FF3 and FF5 are reset. In its initial condition, therefore, the calibration control logic generates a CAL MODE output.

When the operator depresses the CALIBRATE pushbutton switch, the positive-going START CALIBRATION command sets flip-flops FF3 and FF5. Setting of FF5 terminates the CAL MODE signaL and initiates the CAL MODE signal. When the next C2 (SYNC CLOCK) positive-going pulse occurs, the Q output of FF4 goes high, thereby initiating the DOWN (CAL) signal. This is gated with the CAL MODE signal in NAND gate G13 and transmitted as the DRIVE DOWN command to the driver interface logic 74, via NAND gate G3 and the AUTO DRIVE/MAIN DRIVE switch.

Closure of the external PROBES AT REFERENCE switch causes relay K1 to energize. This action, in turn, terminates the REFERENCE signal from NAND gate G11, resets flip-flop FF3 and transmits a PRESET command to up/down counters No. 1 and No. 2 (94 and 96). When the next C2 (SYNC CLOCK) positive-going pulse occurs, the Q output of flip-flop FF4 goes high, thereby initiating the UP (CAL) signal. This is gated with the CAL MODE signal in NAND gate G14 and transmitted as the DRIVE UP command to the driver interface logic 74.

The mode switching logic 112 consists of NAND gate G15 and inverting buffer A12.

The NAND gate monitors the status of the Q outputs of flip-flops FF1 and FF2. When both sensors in the probe assembly emerge from LNG as a result of operation during the calibration mode, these Q outputs go low (as previously described), and inverting buffer A12 generates the END CALIBRATION command. Since the "D" input to flip-flop FF5 in the calibration control logic is tied to ground, the positive-going transition of the END CALIBRATION command causes the Q and Q outputs of this flip-flop to go high and low, respectively.

Figure 5:
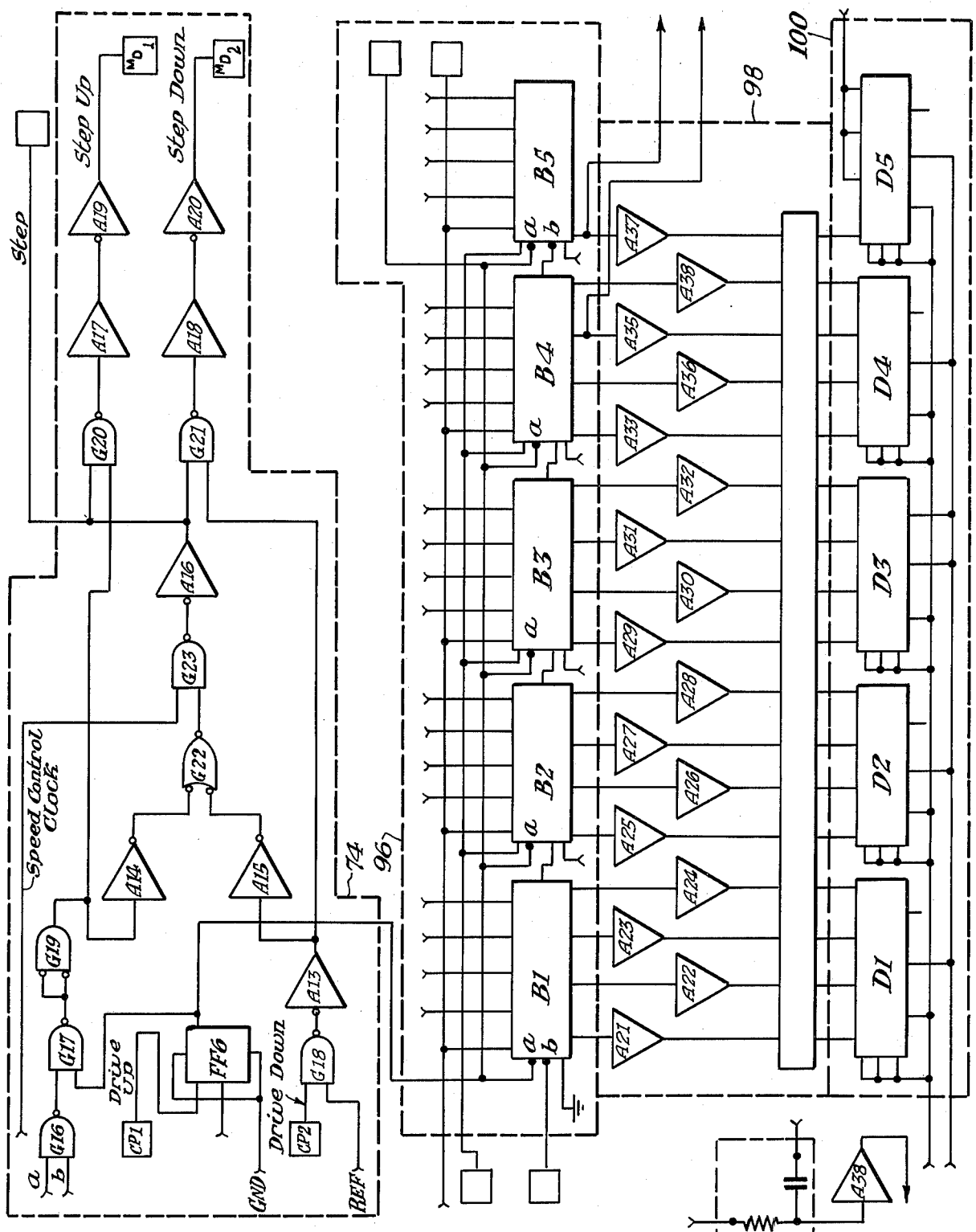
FIG. 5 shows a schematic block diagram of the control and display logic circuitry utilized in the instant invention including the liquid level display.

FIG. 5 shows the driver interface logic 74 consisting of NAND gates G16 through G23 and buffers A13 through A20, the outputs connected to the motor driver 76 (FIG. 3).

The C3 (SPEED CONTROL CLOCK) output of the counter and gating logic provides the source of the STEP, STEP UP and STEP DOWN command outputs of the driver interface logic 74.

The DRIVE DOWN command generated in the direction control logic 52 (FIG. 4) is gated in NAND gate G18 with the REFERENCE signal output from the calibration control logic 48 to assure that the STEP DOWN command is not generated if the probe assembly is already at the reference point.

The DRIVE UP command generated in the direction control logic 52 is gated in NAND gate G17 with the 100ft. and 40ft. outputs of up/down counter No. 2 (element 96). When the count in the counter reaches 140 feet, the STEP UP command is inhibited and further upward movement of the probe assembly will cease. The circuit consisting of gates G16, G17 and G19, therefore, prevents the probe assembly from being driven through the reducer/closure valve/pipe flange assembly during normal system operation.

Up/down counter No. 2 (element 96, FIG. 5) consists of presettable counters B1, B2, B3, B4 and B5. The Q1, Q2, Q3 and Q4 outputs of each counter are coupled to the LIQUID LEVEL display 100 via a series of non-inverting buffers 98, A21 through A37.

When a count-up operation is called for, data enters the counter via the "carry-in" input (B5, pin b of the hundreths of feet decade). Transfer of each bit to the next stage occurs on the positive-going transition of the COUNTER CLOCK input. When a count-down operation is called for, data exists the counter serially via this line. The presence of the DRIVE UP command at pin a of each counter stage preconditions the counter to count-up; the absence of this command preconditions the counter to count down.

The PRESET command line is tied to the "preset enable" input of each counter stage. When the PRESET command pulse occurs, the pre-wired combination of low and high levels on the "jam" inputs of each stage causes the counter to assume that count corresponding to the referene height figure.

In FIG. 6, the counter control logic 86 consists of "D" type flip-flops FF7, FF8 and FF9, NAND gates G24 and G25 and inverting buffers A39 and A40. The 1.5 MHz multivibrator 84 consists of retriggerable monostable multivibrator MV1 and buffer A41. The values of C and R in the feedback circuit establish the clock rate of 1.5 MHz.

NAND gate G24 initiates the LOAD SCALING DATA command pulse as a function of the STEP pulse and the 1.5 MHz clock. That is, when the first STEP pulse occurs, initially-reset flip-flop FF7 sets. The next positive-going transition of the 1.5 MNz clock activates NAND gate G24 via flip-flop FF8. The LOAD SCALING DATA command pulse, thus enabled, is applied to the "preset enable" input of each counter stage in the down counter, and is tied to the "reset" input of flip-flop FF7. Resetting this flip-flop assures that the LOAD SCALING DATA command pulse occurs at the STEP command pulse rate and not at the 1.5 MHz rate.

The COUNTER CLOCK and COUNT DOWN CLOCK are generated at the 1.5 MHz rate, by virtue of NAND gate G25. That is, the 1.5 MHz clock is tied to pin a of this gate and is thereby transferred to the subsequent circuitry when NAND gate G24 activates flip-flop FF9.

Each of the scaling switches 88 is a single-pole, single-throw unit; four such switches being contained within a single dual in-line package. The pole of each switch is tied to ground and its contact is tied to the down counter via a "pull-up" resistor. When a given switch is closed (i.e., ON), the ground applied to that input of the down counter represents a logical 0. When a given switch is open (i.e., OFF), the pull-up resistor in its output line assures that a high-level signal (i.e., a logical 1) is applied to that input of the down counter.

The ON/OFF combination of these scaling switches 88 establishes that value which is entered into the down counter upon generation of the LOAD SCALING DATA command. As described previously, this value represents the amount, in feet, by which the probe assembly moves in response to each STEP UP or STEP DOWN command.

In FIG. 6, the down counter 90 consists of presettable counters B6, B7, B8, B9 and B10. The zero detect logic 92 consists of NOR gates G26, G27, G28, G29 and G30, NAND gates G31, G32 and G33 and inverting buffers A42, A43 and A44.

The down counter 90 is pre-conditioned to count-down only, by virtue of the fact that pin a of each stage (i.e., the "up/down" input) is tied to ground. The LOAD SCALING DATA command is tied to the "preset enable" input of each stage. Thus, upon initiation of this command, the combination of low and high levels on the "jam" inputs of each stage causes the counter to assume that count corresponding to the settings of the scaling switches 88. The counter will then start its counting-down operation, upon generation of the COUNT DOWN CLOCK pulse train.

When the count in the down counter reaches zero, the Q1, Q2, Q3 and Q4 outputs of each stage will be low. When the next COUNTER CLOCK pulse is generated, inverting buffer A44 will initiate the STOP COUNT command, thereby resetting flip-flop FF9. This, in turn, inhibits the 1.5 MHz clock from being coupled through NAND gate G25 as the COUNTER CLOCK and COUNT DOWN CLOCK signals.

Up/down counter No. 1 (element 94) consists of presettable counters B11, B12, B13, B14 and B15.

When the DRIVE UP command is in effect, the counter will count up by virtue of the high level present at pin a of each stage. When the DRIVE DOWN command is in effect, the DRIVE UP line will necessarily be low, and the counter will therefore count down.

When a count-up operation is called for, data exits the counter serially via the "carry-out" output (pin a of most significant stage B15) and into up/down counter B1, pin b. Transfer of each bit to the next stage occurs on the positive-going transition of the COUNTER CLOCK input. When a count-down operation is called-for, data enters the counter serially via this line.

The PRESET command line is tied to the "preset enable" input of each counter stage. When the PRESET command pulse occurs, the ground signals applied to the "jam" inputs of each stage cause the counter to assume a count of zero.

The system as described may be further utilized in conjunction with a temperature sensor and/or a density detecting device to provide a spectrum from the bottom of the tank to the top of the tank including the liquid contained therein showing a particular temperature or a particular density per unit of depth. Thus, the probe may include a temperature measuring device and/or a density measuring device which is moveable to graphically show a temperature or density profile of the liquid contained in a storage tank. This can be extremely helpful in the storage of liquid natural gas to detect "roll over" conditions and the like which can create a dangerous condition in the tank.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A machine for determining the distance from the bottom of a storage tank to the liquid-vapor interface of a liquid stored therein comprising:
    a movable liquid-vapor interface probe in the storage tank, said probe including at least one electrically actuated medium sensing element;
    a drive means including a cable, a motor means, and a motor control means;
    said cable at least partially extending into said storage tank, said cable connected to said probe;
    a measurement signal means; said motor means connected to said cable for lifting and lowering said cable and said probe within said storage tank, said motor means connected to said measurement signal means to provide at least one liquid-vapor interface position signal;
    said motor control means connected to said motor, means and said liquid vapor interferface probe;
    said measurement signal means connected to said motor control means for providing at least one liquid-vapor interface position signal;
    a sensing system connected to said cable for sensing the bottom of said storage tank, said sensing system connected to said motor control means and said measurement signal means to provide liquid-vapor interface position signal from the bottom of the storage tank.

2. A machine as in claim 1, wherein:
    said medium sensing elements have a variable electrical resistance dependent upon heat dissipation of the elements.

3. A machine as in claim 1, including:
    said probe including a first and a second electrically actuated medium sensing element;
    said motor control means includes a first and second level detection circuits and a motor direction and speed control means having an output;
    said first level detecting circuit connected to said first sensing element;
    said second level detecting circuit connected to said second sensing element;
    said direction and speed control means connected to said first and second level direction circuits;
    said motor control means including a counting and gating logic means connected to said output of said first and second level detecting circuit means;
    said motor means includes a probe drive and a pulse actuated stepping motor connected to said probe drive;
    said motor control means including motor driver circuit means connected to said motor said counting and gating logic means and said direction and speed control means;
    pulse counting means connected to said signal means and said counter and gating logic means, said pulse counting means connected to said motor control means to step said motor.

4. A machine for determining the distance from the bottom of a storage tank to the liquid-vapor interface of a liquid stored therein comprising:
    a liquid vapor interface probe, said probe including a pair of electrically actuated medium sensing elements having an output;
    a cable within said storage tank, said cable having said probe connected adjacent one end thereto;
    pulse actuated stepping motor, said cable connected to said motor for lifting and lowering said cable and said probe placed within said storage tank;
    a motor direction and speed control means connected to said motor and the output of said liquid vapor interface sensing elements;
    liquid depth measurement display means for providing distance data connected to said motor control means;
    a probe drive means connected to said motor and said cable, said probe drive means connected to said motor control means and said display means;
    pulse counting means connected to said motor control means and said display means
    a pair of guide wires connected to said probe;

a weight coupled to the end of said guide wires, said weight having a probe receiving aperture disposed therethrough; and a tension switch connected to said cable and said probe drive means for providing a signal indicative of said probe contacting the bottom of the tank for calibration purposes.

5. A machine for determining the distance from the bottom of a storage tank to the liquid-vapor interface of a liquid stored therein comprising:

a liquid vapor interface probe, said probe including a pair of electrically actuated medium sensing elements having an output;

a cable within said storage tank, said cable having said probe connected adjacent one end thereto;

pulse actuated stepping motor, said cable connected to said motor for lifting and lowering said cable and said probe placed within said storage tank;

a motor direction and speed control means connected to said motor and the output of said liquid vapor interface sensing elements;

liquid depth measurement display means for providing distance data connected to said motor control means, a probe drive means connected to said motor and said cable, said probe drive means connected to said motor control means and said display means; pulse counting means connected to said motor control means and said display means, said medium sensing elements have a variable electrical resistance dependent upon heat dissipation of the elements;

a first level detecting circuit means connected to a first sensing element;

second level detecting circuit connected to a second sensing element;

a counting and gating logic means connected to the output of said first and second level detecting circuit means;

said motor control means including motor driver circuit means connected to said motor and said counter and gating logic means;

said pulse counting means connected to said counter and gating logic means, said motor control means including a speed control means connected to said motor driver and said counter engaging logic means;

motor direction control means connected to said first and second level detection circuit means.

6. A liquid level detecting device, as in claim 4, wherein said pulse counting means includes:

counter control logic means connected to said counter and gating logic means;

a down counter circuit means connected to said counter control-logic means;

a plurality of scaling switches whose output is connected to said down counter;

plurality of up and down counters connected to said direction control logic means and said speed select logic means the output of the counters being coupled to the liquid level display means, the liquid level display means including a numerical digital display means for displaying the liquid level in the tank in predetermined measurements in measuring units.

7. A liquid level detection device, as in claim 5, including:

said cable having a hollow interior, said cable having a helical gear tooth periphery;

said probe drive means includes a helical drive pulley connected to said cable and said motor for engaging said cable.

8. A device for measuring the liquid level in a closed storage tank comprising:

a pair of thermally responsive heat sensing elements, said elements disposed vertically relative to each other forming an upper sensing element and a lower sensing element;

an electrical power source;

a cable disposable within a storage tank, said cable having said upper and lower sensing probes connected thereto at one end;

a probe-cable stabilizing means connected within a storage tank to said probe;

a display means for displaying the depth of the liquid in measurable units;

a motor control circuit means connected to said power source to said motor and to said sensing probes;

pulse counting means connected to said control circuit means;

a means connected to said sensing probes for providing a signal when said upper probe is disposed in a vapor environment and said lower sensing probe is disposed in a liquid environment;

motor control means connected for incrementally driving said motor in steps as a function of a plurality of pulses;

means connected for controlling said motor to drive said probe to the bottom of the tank simultaneously provide a zero reference point for said counting control means; and means connected for driving said probe upward from the bottom of said tank until said upper sensor is in a vapor environment and said lower sensor is in a liquid environment indicative of the liquid level interface; and a means for counting the incremental steps of said motor to determine the distance from the bottom of the tank to the liquid level interface at the probe position.

9. A liquid level detecting device as in claim 8, including:

speed and direction control circuit means connected to said motor control driver means;

a zero reference control input means connected to said direction control circuit means whereby said probe measurement may be calibrated by said motor driving said probes to the bottom of the tank and establish a zero reference point.

10. A liquid level indicating device, as in claim 8, including:

a weight;

a pair of guide wire connectable outside of said tank and connected at one end to said weight, said weight having a probe receiving aperture disposed therein, said guide wires being connected to said probe for stabilizing the probe between the wires, whereby the probe is receivable through the aperture in the weight so that the probe may contact the bottom of the tank.

11. A device for detecting and measuring in a visual remote display the liquid level in a closed liquid storage tank comprising:

a cable, said cable having a helical gear tooth surface coupled about its periphery;

a vapor liquid interface probe connected at one end of said cable, said probe including an upper sensing element and vertically disposed below, a lower sensing element, said upper sensing element and said lower sensing element having a variable electrical resistance as a function of heat dissipation;

a first level detection circuit means connected to said upper sensing element;

a second level detection circuit means connected to said lower sensing element;

a pulse actuated stepping motor, said motor being moveable in a first direction or a second opposite direction;

a means for connecting said cable to said motor whereby said motor may move said cable vertically upwardly or downwardly;

a motor direction and speed control circuit means connected to said first and second level detection circuit means and said motor;

liquid level measurement display means;

motor direction and control circuit means connected to said first and second level detection circuits in said motor;

pulse counting means connected to said motor direction and speed control circuit means; and means for sealably connecting said cable and said motor within the same vapor atmosphere as in the storage tank.

12. A liquid level determining device, as in claim 11, including:

a probe and cable guide means disposable within the same vapor atmosphere as in said storage tank, said probe and guide means including a weight disposed at one end, said probe being moveably coupled to said guide means and moveable within said tank.

13. A device for determining the liquid vapor interface of a liquid as in claim 12, wherein:

said probe guide includes a weight having an aperture disposed through the center, said aperture sized to receive said probe so that said probe may engage the bottom of the tank, said weight being disposed on the bottom of said tank;

a tension switching means connected to said cable for detecting when said probe engages the bottom of said tank whenever the tension on said probe cable is reduced.

14. A liquid level measuring and detecting device, as in claim 13, including:

a first up-down counting circuit means;

a second up-down counting circuit means;

said first and second up-down counters connected to said liquid level display means;

counter control logic circuit means connected to said first and second up and down counter means.

15. A liquid level device, as in claim 14, including:

a load switch and circuit control means for providing a manual positioning of said probe and a probe drive means connected to said motor and said probe for manually positioning said probe within said storage tank.

16. A device mountable on a storage tank for storing liquid gas, said device including a remote distance measuring display device providing a distance from the bottom of a storage tank to the liquid vapor interface comprising:

probe means for detecting a liquid vapor interface;

means for positioning said probe means vertically within the storage tank to a position about the liquid vapor interface, said means for positioning connected to said probe means;

means for moving said probe means fron a first position at the bottom of said tank to a second position at the liquid vapor interface said means for moving connected to said means for positioning;

means for generating a signal continuously indicative of the distance moved by said probe means from said first position at the bottom of said tank to said liquid vapor interface, said means for generating a signal connected to said means for moving; and means connected to said means for generating a signal for displaying indicia representing the distance between the bottom of said tank and the probe means; and a bottom sensing system connected to said means for sensing the bottom of said storage tank, said sensing system connected to said means for moving and said means for displaying.

17. A machine for determining the position of the liquid-vapor interface in a storage tank comprising:

a movable liquid-vapor interface probe in the storage tank, said probe including at least one electrically actuated medium sensing element, said medium sensing element having a variable electrical resistance dependent upon each dissipation of the element;

a drive means including a cable, a motor means, and a motor control means;

said cable at least partially extending into said storage tank, said cable connected to said probe;

said motor means connected to said cable for lifting and lowering said cable and said probe within said storage tank, said motor means connected to a measurement signal means to provide at least one liquid-vapor interface position signal;

said motor control means connected to said motor and said liquid-vapor interface probe;

said measuring signal means connected to said motor control means for providing at least one liquid-vapor interface position signal; and a sensing means for sensing the bottom of the tank connected to said drive means and said measuring signal means.

18. A machine as set forth in claim 17 wherein;

said sensing element sensing both temperature and density;

said motor control means including means to drive said drive means from a bottom position to an interface position for providing output signals for detecting a rollover condition.

* * * * *